(12) United States Patent
He et al.

(10) Patent No.: US 11,310,161 B2
(45) Date of Patent: Apr. 19, 2022

(54) METHOD AND SYSTEM FOR PACKET SIZE MANAGEMENT

(71) Applicant: Verizon Patent and Licensing Inc., Arlington, VA (US)

(72) Inventors: Dayong He, Bridgewater, NJ (US); Sudhakar Reddy Patil, Flower Mound, TX (US); Ray P. Hwang, Green Brook, NJ (US); Jyotsna Kachroo, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/537,787

(22) Filed: Aug. 12, 2019

(65) Prior Publication Data

US 2021/0051104 A1 Feb. 18, 2021

(51) Int. Cl.
| | |
|---|---|
| *H04L 12/851* | (2013.01) |
| *H04L 12/805* | (2013.01) |
| *H04L 29/08* | (2006.01) |
| *G06N 20/00* | (2019.01) |
| *H04L 47/24* | (2022.01) |
| *H04L 69/329* | (2022.01) |
| *H04L 67/63* | (2022.01) |
| *H04L 47/36* | (2022.01) |

(52) U.S. Cl.
CPC ............ *H04L 47/24* (2013.01); *G06N 20/00* (2019.01); *H04L 47/36* (2013.01); *H04L 67/327* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 10,820,371 B1* | 10/2020 | Huang | H04W 28/06 |
| 2004/0022203 A1* | 2/2004 | Michelson | H04L 29/06027 370/282 |
| 2005/0111437 A1* | 5/2005 | Maturi | H04L 47/10 370/352 |
| 2007/0248023 A1* | 10/2007 | Chui | H04L 65/80 370/252 |
| 2009/0059929 A1* | 3/2009 | Lee | H04W 52/281 370/395.4 |
| 2010/0322249 A1* | 12/2010 | Thathapudi | H04L 47/10 370/395.1 |
| 2014/0101435 A1* | 4/2014 | Kinoshita | H04L 63/164 713/151 |
| 2015/0200860 A1* | 7/2015 | Kampeas | H04L 43/026 370/235 |
| 2016/0277953 A1* | 9/2016 | Andersson | H04L 41/12 |
| 2018/0077075 A1* | 3/2018 | Sreenivasan | H04L 45/26 |

(Continued)

*Primary Examiner* — Jonathan A Bui
*Assistant Examiner* — Mohammad Yousuf A. Mian

(57) ABSTRACT

A method, a device, and a non-transitory storage medium are described in which a packet size service is provided. The packet size service may calculate a payload size for packets that include application service data. The packet size service may inform an end device and an application service layer network of the calculated payload size. The packet size service may obtain quality of service information pertaining to an application service, and other information as a basis for the calculation. The packet size service may use a machine learning system to calculate the payload size.

20 Claims, 11 Drawing Sheets

(56) References Cited

U.S. PATENT DOCUMENTS

2018/0181088 A1* 6/2018 Kelly ................... G06F 9/5072
2020/0059942 A1* 2/2020 Itoh ................... H04W 72/1221
2020/0153701 A1* 5/2020 Mohan ................. H04L 41/147

* cited by examiner

METHOD AND SYSTEM FOR PACKET SIZE MANAGEMENT

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, functions, communication links, etc.) are situated at different locations, such as at the network edge, in order to reduce traffic being sent to the core network, reduce latency, improve resource utilization, and improve other provisioning-related facets of communication.

DETAILED DESCRIPTION OF PREFERRED EMBODIMENTS

Figure 1:
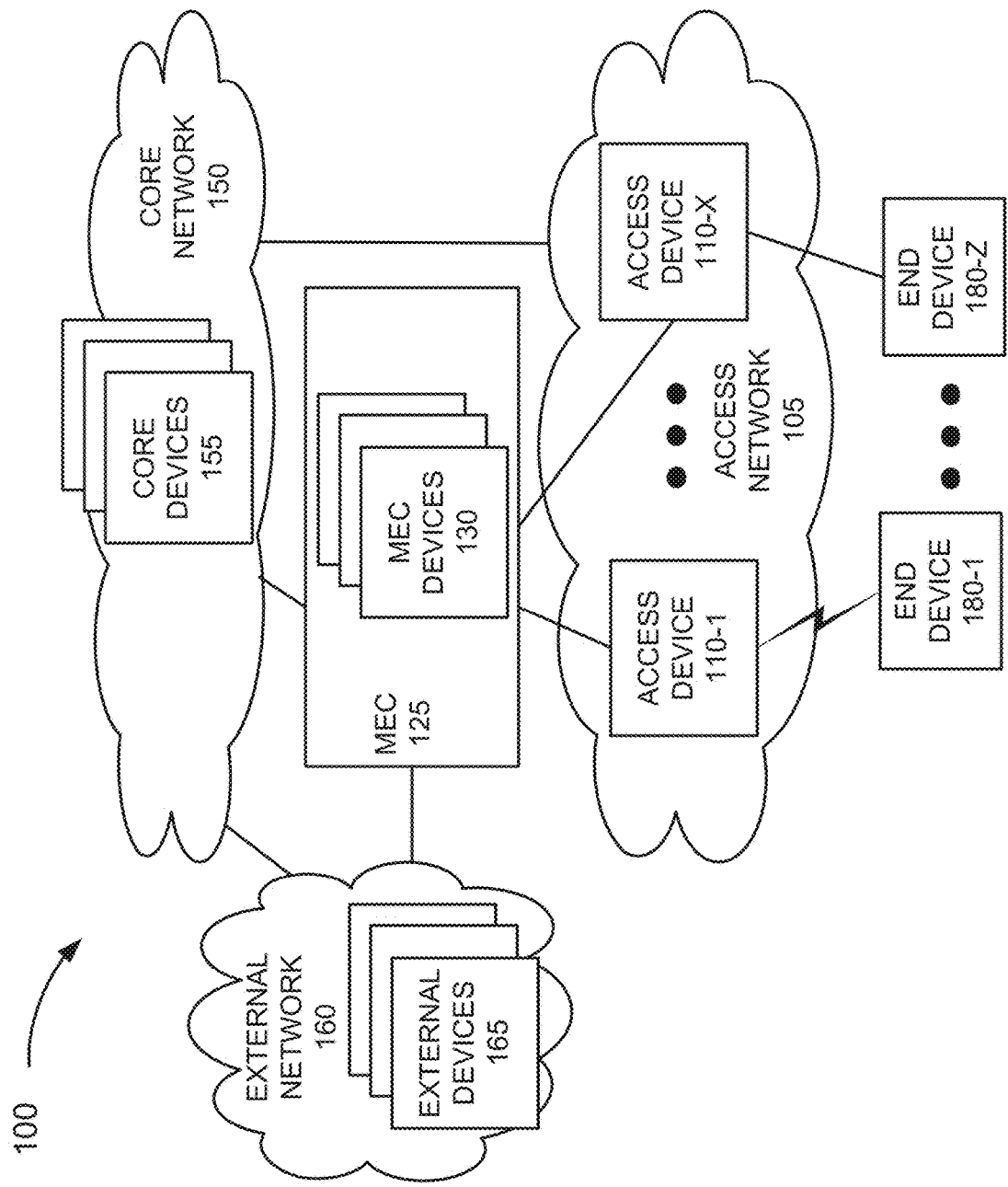
FIG. 1 is a diagram illustrating an exemplary environment in which an exemplary embodiment of a packet size service may be implemented.

The following detailed description refers to the accompanying drawings. The same reference numbers in different drawings may identify the same or similar elements. Also, the following detailed description does not limit the invention.

End device communication with MEC networks or other types of end device application or service layer networks (referred to as "application service layer network") presents various complexities, such as the selection of the network protocol (e.g., Transmission Control Protocol (TCP), User Datagram Protocol (UDP), Hypertext Transfer Protocol (HTTP), Real-Time Transport Protocol (RTP), RTP Control Protocol (RTCP), Real-Time Streaming Protocol (RTSP), or another protocol), the adherence to certain quality of service (QoS) metrics (e.g., bandwidth, latency, packet lose rate, reliability, round trip time, and/or another QoS metric, adherence to a service level agreement (SLA)), security requirements (e.g., use of encryption, no encryption, selection of encryption algorithm, or another security measure), the type of data to be communicated (e.g., video, text, image, audio, multi-media, audio and video, or another type of data), management of states (e.g., load, availability of free resources, congestion, mitigation of congestion, and/or another state) of resources (e.g., central processing unit (CPU), graphic processing unit (GPU), memory, battery, storage, communication link, software, virtual, logical, and/or another type of resource) at the end device and at the application service layer network, factors relating to network traffic status (e.g., peak hours, non-peak hours, congestion, network traffic routing, packet loss and retransmission rate/ratio, and/or another type of attribute of network traffic), the number of communication channels (e.g., single, multiple, etc.), pre-processing of data (e.g., compression, no compression, compression ratio, compression algorithm, etc.), processing of data, and/or providing a function, a process, and/or a service at the end device, at the application service layer network, or both (e.g., partially at the end device and partially at the application service layer network).

The condition of a network connection between the end device and the application service layer network may change over time, and such change may impact a packet retransmission rate. Depending on the size of the packet and associated fields (e.g., header, payload, etc.), the time required to complete a communication may vary, as well as affect resource utilization in the network and at the end device. For example, when data is divided into smaller chunks relative to larger chunks, the size of the payload field in each packet is smaller and the total number of packets used to communicate the data is increased, as well as the total amount of data when considering other fields of the packets (e.g., a header, a trailer, etc.). Conversely, when larger chunks of data are used in the payload field and each packet is larger, such a configuration may negatively impact a packet error rate (PER) and a packet retransmission ratio. Additionally, while the size of the payload can vary in size, the total size of other fields in the packet is usually fixed.

Currently, network personnel may monitor the performance of network traffic. For example, the network personnel may evaluate network performance based on a network configuration setting pertaining to the payload size of a packet. When network performance is determined to be sub-optimal, the network personnel may create a new payload size value, verify this new value with vendors, test the new value, and apply the new value to a network configuration setting. Unfortunately, this process requires significant human intervention. Further, network performance not only changes over time, but can vary between different locations, different use cases, and/or other factors that may impact network performance or network connection conditions. In this regard, such a process may be impractical and not adequately address the dynamic nature of network performance.

According to exemplary embodiments, a packet size service is provided. According to an exemplary embodiment, the packet size service is provided from both a network-side perspective and an end device-side perspective. For example, a network device located in an application layer service network may provide the packet size service, as described herein. According to other exemplary embodiments, the packet size service may be provided based on a combination of network devices in which some are part of the application service layer network and some are not. According to an exemplary embodiment, an end device may provide the packet size service, as described herein.

According to an exemplary embodiment, the packet size service calculates a size for a packet and/or a payload size (also referred to herein as "packet size") based on various criteria. According to an exemplary embodiment, the criteria may include QoS information, network traffic status information, application data type information, network protocol information, security requirement information, number of communication channels information, application service layer network resource information, end device resource information, pre-processing of data information, processing of application data information (e.g., indicating whether an end device or an application server analyzes or performs some other processing of application data), and/or function and/or service information (e.g., indicating whether an end device or an application server performs a function or partial service of the application service), as described herein (also referred to as packet size information). According to an exemplary embodiment, the packet may include other fields such as a header, a trailer, footer, a reserved field, an options field, an extension header, a padding field, or another type of segment of the packet.

According to an exemplary embodiment, the packet size service informs an end device and/or a network device of the application service layer network (e.g., a server device that hosts an application service) of the calculated packet size. In this way, the end device and/or the server device may communicate data using packets that are of the calculated packet size.

According to an exemplary embodiment, the packet size service may calculate and/or recommend other attributes associated with a communication and/or application service. For example, the packet size service may determine which or how application service data may be sent. By way of further example, for an augmented reality (AR) service, the packet size service may select a set of pixels of an image to be sent first before a second set of pixels of the image may be sent based on the packet size information (e.g., type of data, etc.). Additionally, or alternatively, the packet size service may determine whether the application service data is pre-processed in the application service layer network or at the end device based on the packet size information (e.g., available resources at the end device and/or a server device that hosts an application service, etc.). The packet size service may make other types of determinations pertaining to the transmission and/or processing of application service data, or other type of provisioning parameter, as described herein.

According to various exemplary embodiments, the packet size service may calculate a packet size based on a triggering event. For example, the triggering event may be the start of an application service session between an end device and a server, a timer, a congestion level in the network, and/or according to some other configurable parameter. The packet size service may recommend other types of provisioning parameters (e.g., pre-processing of application data, etc.) in a similar fashion. The packet size service may be applied on a per application service or category of the application service basis.

In view of the foregoing, the packet size service provides for the dynamic control of packet size and/or other attributes relating to the exchange of data between the application service layer network and an end device. As a result, the packet size service may improve resource allocation and/or utilization at the end device and/or in the network. For example, depending on the size of the payload of the packet, the time needed to complete the transmission of data via a fixed network bandwidth may be reduced, as well as the resources allocated and used (e.g., at the end device, the application service layer network, intermediary networks (e.g., radio access network, backhaul network, fronthaul network, radio resources, etc.), while still satisfying QoS, SLA, user experience, and/or other facets pertaining to the application service.

FIG. 1 is a diagram illustrating an exemplary environment 100 in which an exemplary embodiment of the packet size service may be implemented. As illustrated, environment 100 includes an access network 105, a MEC network 125, a core network 150, and an external network 160. Access network 105 may include access devices 110-1 through 110-X (referred to collectively as access devices 110 and individually (or generally) as access device 110). MEC network 125 may include MEC devices 130, core network 150 may include core devices 155, and external network 160 may include external devices 165. Environment 100 further includes end devices 180-1 through 108-Z (referred to collectively as end devices 180 and individually (or generally) as end device 180).

The number, type, and arrangement of networks illustrated in environment 100 are exemplary. For example, an application service layer network other than MEC network 125 may be implemented to include the packet size service, such as external network 160. Additionally, or alternatively, other networks not illustrated in FIG. 1 may be included, such as a backhaul/fronthaul network or another type of network, as described herein.

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network/network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the packet size service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and/or between a network device and an end device in support of the packet size service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), a Bluetooth network, a personal area network (PAN), or another type of network (e.g., a legacy Third Generation (3G) RAN, etc.) that may be considered a network edge. Additionally, or alternatively, access network 105 may include a wired network and/or an optical network.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a CU, a DU, a small cell node (e.g., a picocell device, a femtocell device, a microcell device, a home eNB, a repeater, etc.)), a future generation wireless access device, or another type of wireless node (e.g., a WiFi device, a WiMax device, a hot spot device, etc.) that provides a wireless access service. Additionally, or alternatively, access devices 110 may include wired and/or optical devices (e.g., modem, wired access point, optical access point, Ethernet device, etc.) that provide access to an application service layer network, such as MEC network 125.

MEC network 125 includes a platform that provides an application service. MEC network 125 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology.

Depending on the implementation, MEC network 125 may include various types of network devices that are illustrated in FIG. 1 as MEC devices 130. For example, MEC devices 130 may include virtualized network functions (VNFs), multi-access (MA) applications/services, and/or servers. MEC devices 130 may provide various end device and user device applications or services (referred to as application services). For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), and/or broadcast-like services.

MEC devices 130 may also include other network devices that support its operation, such as, for example, an orchestrator (e.g., a network function virtualization orchestrator (NFVO), a mobile edge (ME) orchestrator, etc.), an edge manager (e.g., a virtualized infrastructure manager (VIM), a virtual network function manager (VNFM), an ME platform manager), an operations support system (OSS), a local domain name system (DNS), registries, and/or other types of network devices (e.g., routers, core devices 155 (e.g., a user plane function (UPF), etc.), an ingress device, a load balancer, etc.), and network resources (e.g., storage devices, communication links, local access data network (LADN), etc.). According to an exemplary embodiment, at least one of MEC devices 130 includes logic that provides the packet size service, as described herein. For example, this MEC device 130 may be implemented as a server device or another type of network device.

Core network 150 may include one or multiple networks of one or multiple network types and technologies. Core network 150 may include a complementary network of access network 105. For example, core network 150 may be implemented to include an Evolved Packet Core (EPC) of an LTE, an LTE-A network, an LTE-A Pro network, a next generation core (NGC) network, and/or a legacy core network.

Depending on the implementation of core network 150, core network 150 may include various network devices, such as core devices 155. For example, core devices 155 may include a mobility management entity (MME), a packet gateway (PGW), a serving gateway (SGW), a home subscriber server (HSS), an authentication, authorization, and accounting (AAA) server, an authentication server function (AUSF), a policy charging and rules function (PCRF), a charging system (CS), a UPF, an access and mobility management function (AMF), a session management function (SMF), a unified data management (UDM) device, an authentication server function (AUSF), a network exposure function (NEF), a network slice selection function (NSSF), a network repository function (NRF), a policy control function (PCF), a network data analytics function (NWDAF), and so forth. According to other exemplary implementations, core network 150 may include additional, different, and/or fewer network devices than those described.

External network 160 may include one or multiple networks. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service.

Depending on the implementation, external network 160 may include various network devices, such as external devices 165. For example, external devices 165 may provide various applications, services, or other type of end device assets, such as servers (e.g., web, application, cloud, etc.), mass storage devices, data center devices, and/or other types of network devices pertaining to various network-related functions.

End device 180 includes a device that has computational and communication capabilities (e.g., wireless, wired, optical, etc.). End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a global positioning device, a drone, customer premise equipment (CPE) (e.g., a set top box, etc.), a television, a streaming player device, an Internet of Things (IoT) device, or some other type of wireless, wired, and/or optical device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc. According to an exemplary embodiment, end device 180 includes logic that provides the packet size service, as described herein.

FIGS. 2A-2G are diagrams illustrating an exemplary process of the packet size service in an exemplary environment 200. As illustrated, access devices 110 of access network 105 may include a gNB 210. Also, MEC devices 130 of MEC network 125 may include servers 220 that provide an application service, a packet size service (PSS) device 224, and a UPF 226. End device 180 may include a PSS component 202 and at least one application 204.

PSS component 202 may include logic that provides a packet size service from the end device perspective. For example, PSS component 202 may obtain one or multiple instances of packet size information, provide the packet size information to PSS device 224, receive and manage packet size recommendations from PSS device 224, receive and manage other attributes pertaining to the application service (e.g., how data is to be transmitted, etc.), and provide other functions or services, as described herein, that support the packet size service. PSS component 202 may include APIs and/or other interfaces to communicate with other components of end device 180 (e.g., application 204, a network control layer or interface, etc.). Application 204 may provide an application service.

Figure 2A:
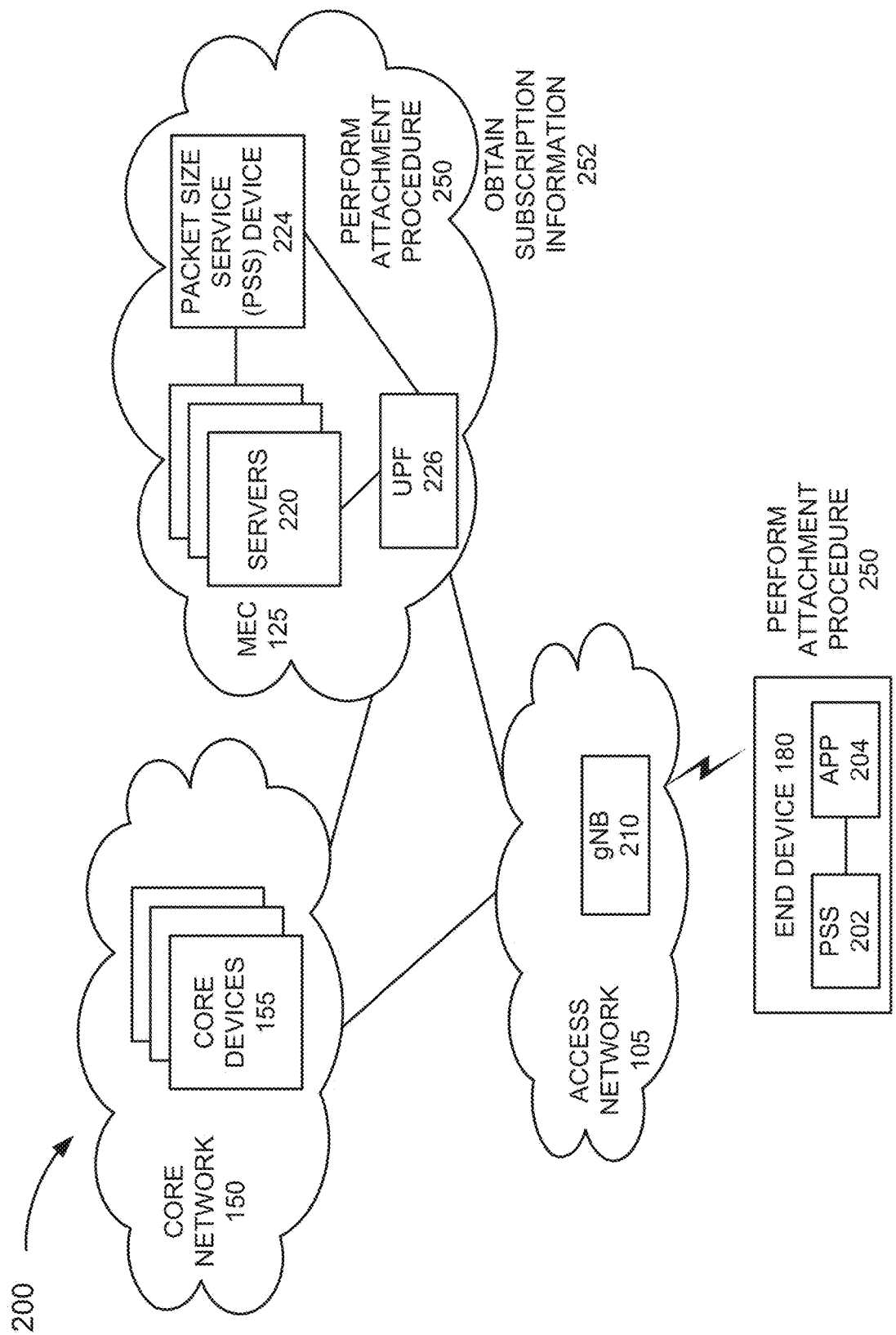
FIGS. 2A-2G are diagrams illustrating an exemplary process of an exemplary embodiment of the packet size service according to an exemplary scenario.

Referring to FIG. 2A, according to an exemplary scenario, assume that end device 180 and MEC network 125 perform an attachment procedure 250. According to an exemplary implementation, as a part of the attachment procedure, MEC network 125 may obtain subscription information 252 pertaining to end device 180. For example, MEC network 125 may obtain the subscription information from core device 155 (e.g., an HSS, a UDM, etc.) of core network 150, or from MEC device 130 (e.g., an HSS, a UDM, etc.) of MEC network 125 (not illustrated) that stores subscription information. The subscription information may store a level or a tier of service (e.g., wireless service, application service, etc.) for end device 180 (and/or user associated with end device 180). According to some exemplary embodiments, the subscription information may pertain to the packet size service in which the packet size service may provide different levels or tiers of service to an end user. For example, the packet size service may be applied to all application services of the end user or only a portion of the application services (e.g., critical application services, ultra-reliable, etc.).

Additionally, for example, as a part of the attachment procedure, security measures may be performed, such as authentication and/or authorization (e.g., an AUSF, an AAA, an MME, an AMF, etc.), a bearer or network slice between MEC network 125 (e.g., UPF 226, other core devices 155 residing in MEC network 125, etc.) and end device 180 via access network 105 may be established, as well as other procedures, such as, policy and/or rule selection and charging (e.g., PCF, PCRF, etc.), network slice configuration (e.g., NSSF, etc.) that may occur during attachment and may involve communications between end device 180 and core network 150 and/or MEC network 125, as well as communications between MEC network 125 and core network 150 (not illustrated).

Figure 2B:
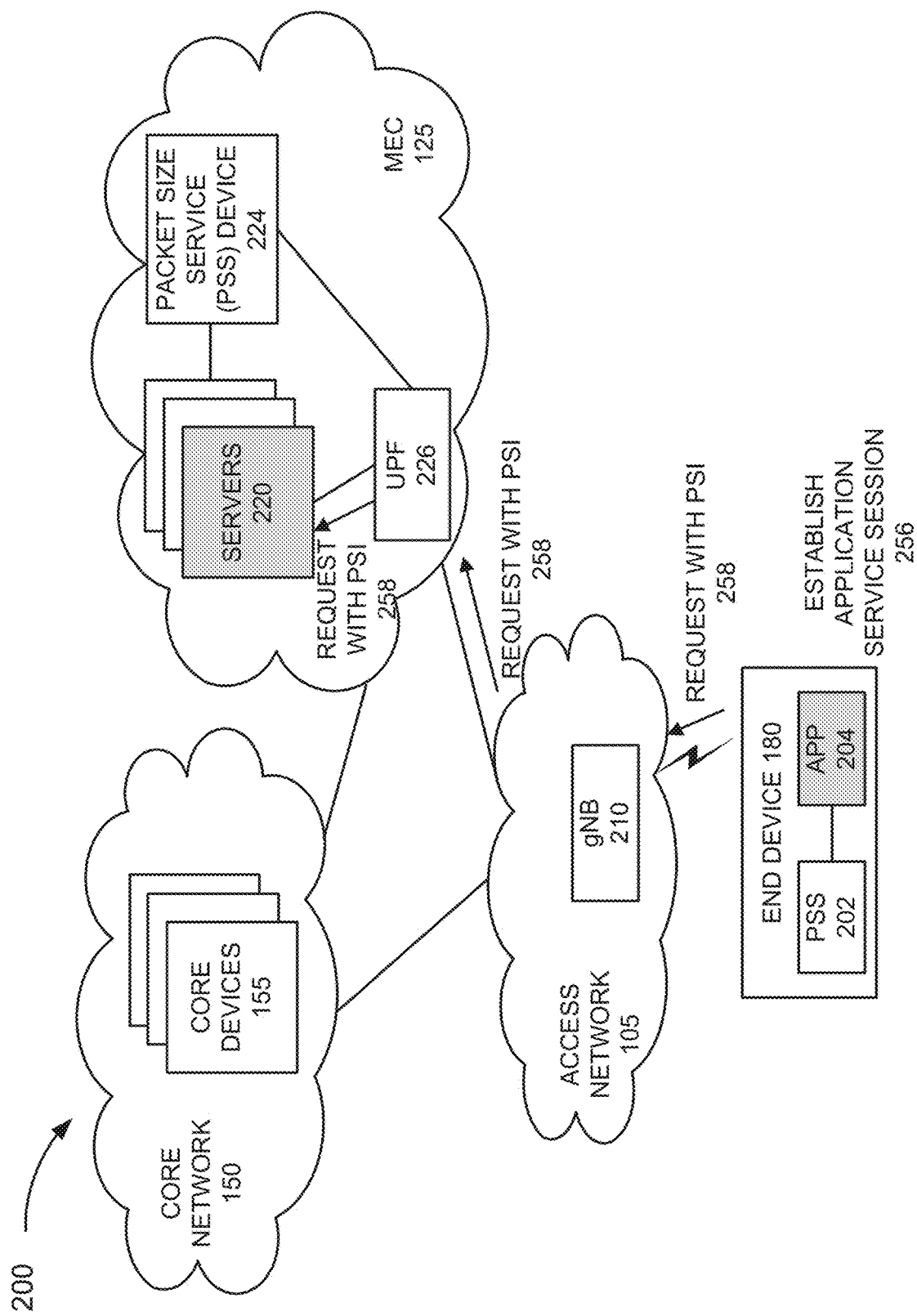

Referring to FIG. 2B, subsequent to the attachment procedure, application 204 of end device 180 may initiate an establishment of an application service session 256 with server 220 of MEC network 125. For example, end device 180 may generate and transmit a request with packet size information (PSI) 258 to server 220 via UPF 226 and gNB 210 of access network 105. The packet size information may include end device resource information. The end device resource information may indicate, for example, resource load information and/or amount of available resources at end device 180. The packet size information may include other types of information, such as end device capability information. The end device capability information may indicate, for example, capabilities relating to the number of communication channels, compression and/or encryption capabilities, and/or other types of end device profile information (e.g., protocols supported, etc.).

According to other exemplary embodiments, request 258 may not include packet size information. For example, although not illustrated, end device 180 may transmit a request for the packet size service in a separate message (not illustrated), which includes the packet size information. According to various exemplary implementations, the separate message may be sent to server 220 or PSS device 224 from PSS 202 or application 204. In response to receiving request 258, according to various exemplary implementations, server 220 may or may not establish an application service session with end device 180. According to an exemplary implementation, the establishment of the application service session may include an end-to-end connection between server 220 and end device 180, but without a request for application service data or application service data being communicated between server 220 and end device 180. According to other exemplary embodiments, the calculation and use of the payload size may occur subsequent to application service data having been communicated between server 220 and end device 180. For example, as described herein, the packet size service may update the packet size during an application service session, and/or in response to various triggering events.

Figure 2C:
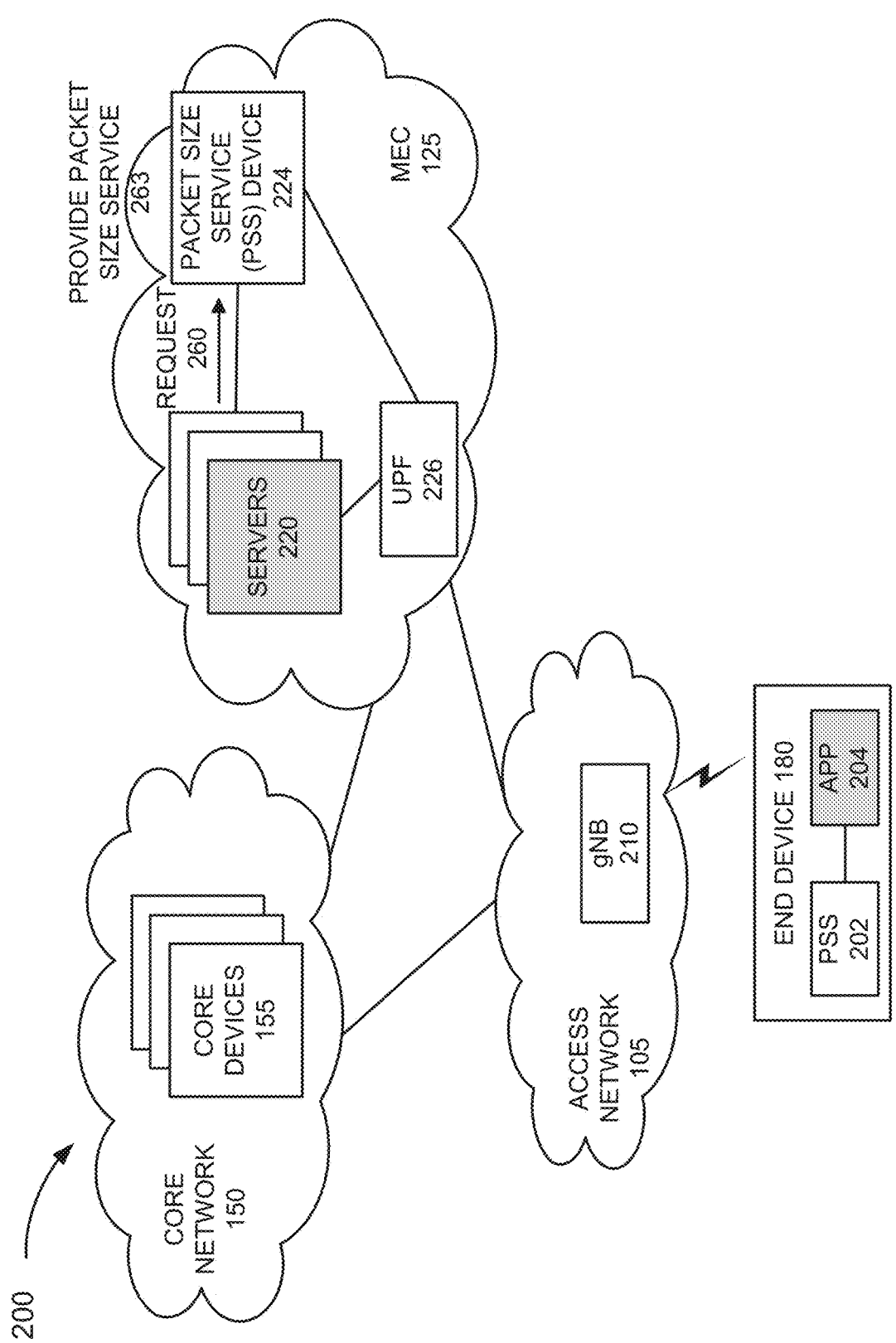

Referring to FIG. 2C, in response to receiving request 258, server 220 may generate and transmit a request 260 to PSS device 224. For example, request 260 may include data to invoke the packet size service, the packet size information included in request 258, and other data (e.g., an identifier of end device 180 or a user, a network slice identifier, communication path information, etc.). Request 260 may include packet size information pertaining to server 220, such as network device resource information that may include resource load information and/or amount of available resource at server 220. According to another exemplary scenario, as previously described, in response to receiving the separate message (e.g., the packet service request), server 220 may generate and transmit request 260, which may include data to invoke the packet size service, the packet size information included in the packet service request, other data (e.g., an identifier, network device resource information). As illustrated, in response to receiving request 260, PSS device 224 may provide the packet size service 263. According to another exemplary scenario, as previously described, PSS device 224 may receive the separate message sent directly from end device 180 (e.g., not via server 220), and in response provide the packet size service 263.

Figure 2D:
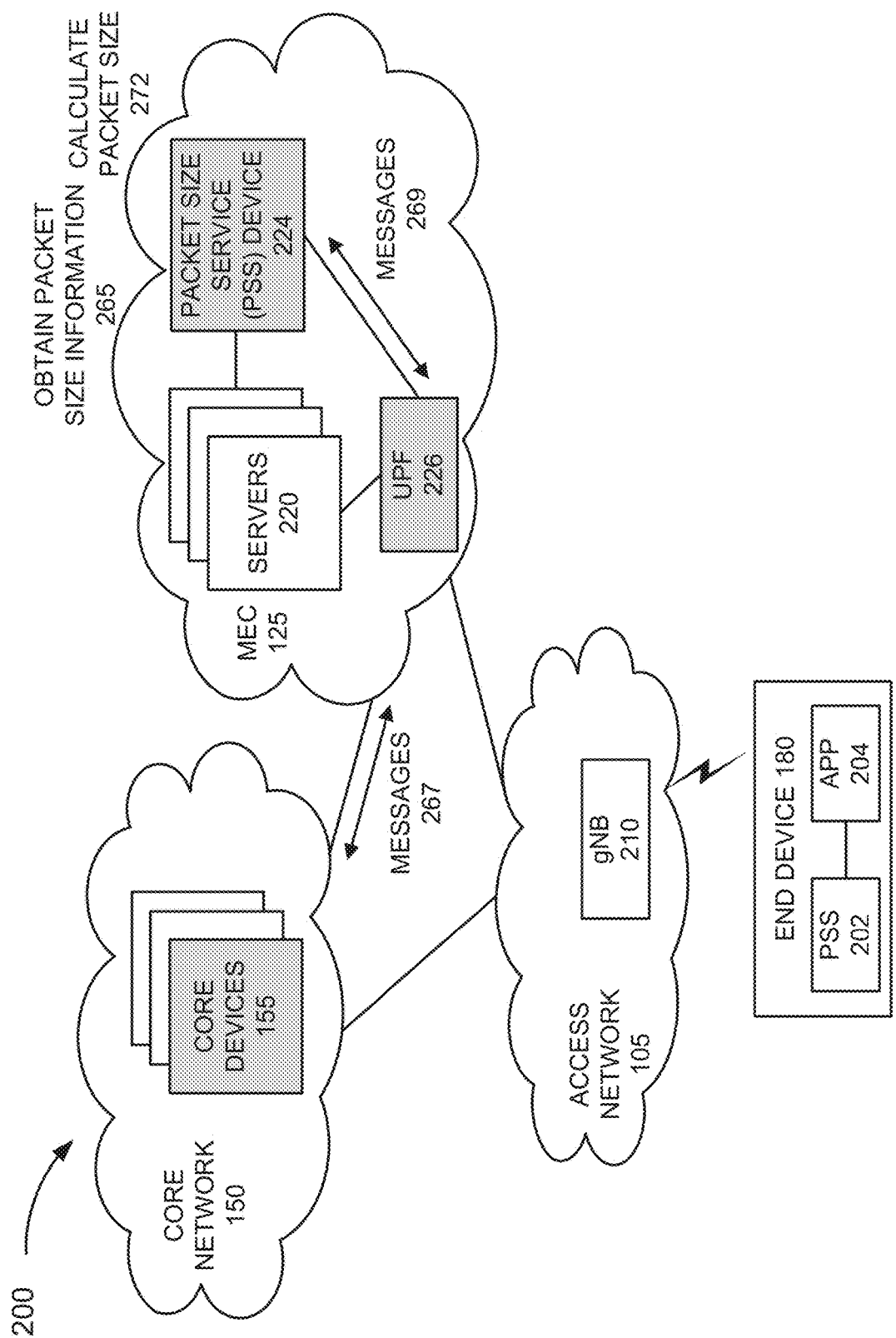

Referring to FIG. 2D, as a part of the packet size service, PSS device 224 may obtain packet size information 265 from various sources. PSS device 224 may obtain the packet size information based on a push or pull method. For example, PSS device 224 may generate and transmit various messages (e.g., messages 267 and messages 269) to query core device 155 of core network 150 and UPF 226 for packet size information. Messages 267 and messages 269 may further include responses (e.g., which include the packet size information) from core device 155 and UPF 226. For example, an NWDAF may provide load information, network traffic status information relating to access network 105, access device 110, other networks (e.g., a backhaul/fronthaul network), and/or a network slice. Additionally, or alternatively, for example, an HSS or a UDM may provide subscription information relating to end device 180.

According to other examples, PSS device 224 may generate and transmit messages to other network devices of environment 100 and/or 200. For example, PSS device 224 may obtain packet size information from MEC devices 130 (e.g., an orchestrator, an edge manager, etc.), a backhaul and/or a fronthaul network device, another network device that may be in a communication path of the application service session (e.g., a load balancer, a router, a gateway, a controller device of a mobile backhaul network, server 220, etc.), and/or a network device that manages or obtains network information pertaining to the other network device (e.g., a network performance monitoring device, etc.). For example, the packet size information may include load information, available resources information, and/or network traffic status information.

Additionally, for example, PSS device 224 may obtain QoS information, protocol to be used information, security requirement information, and type of data pertaining to the application service. Alternatively, PSS device 224 may store some instances of packet size information that correlates to the application service. For example, the application service may require a minimum level of QoS (e.g., bandwidth, latency, etc.), a particular protocol, a security requirement, type of data, and so forth, such that this type of packet size information may readily accessible to PSS device 224.

As further illustrated in FIG. 2D, based on the packet size information, PSS device 224 may calculate a packet size 272. For example, PSS device 224 may calculate a size for a payload based on the following exemplary expression:

$$F_{PS}=f(QoS)+f(\text{network traffic status})+f(\text{type of data})+\\ f(\text{network protocol})+f(\text{security})+f(\text{number of}\\ \text{communication channels})\quad\quad(1),$$

in which PSS device 224 may calculate the size of the payload based on these instances of packet size information. According to other exemplary expressions, PSS device 224 may use additionally, fewer, and/or different instances of packet size information, such as:

$$F_{PS}=f(QoS)+\ldots f(\text{resource load})+f(\text{pre-processing})+\\ f(\text{processing})\quad\quad(2).$$

PSS device 224 may calculate an optimal payload size that preserves a QoS relating to the application service in view of current conditions from an end device-side perspective and a network-side perspective. For example, various QoS metrics, such as bit rate (e.g., maximum, average, minimum, etc.), traffic class, latency, error rate, drop rate, and/or another type of communication metric, may be satisfied or exceeded. Depending on the implementation, PSS device 224 may minimize or maximize other types of criteria values, such as resource utilization at end device 180 and/or server 220, amount of time related to pre-processing or processing of data, etc., when calculating the payload size.

PSS device 224 may use machine learning logic to calculate the packet size. For example, PSS device 224 may use a supervised, an unsupervised, and/or a reinforcement learning system that determine a packet size or a payload size based on the packet size information. By way of further example, PSS device 224 may include a multi-variable linear regression model, a random forest model, a neural network model, a clustering algorithm, a Q-Learning algorithm, a State-Action-Reward-State-Action (SARSA) algorithm, a Deep Q Network (DQN) algorithm, or some other machine learning system that may be configured to determine the packet size for an application service or an application service category (e.g., real-time, a lifeline, extreme real-time, ultra-reliability, massive machine-type communication, or another type of application category) based on correlation with packet size information.

Figure 3:
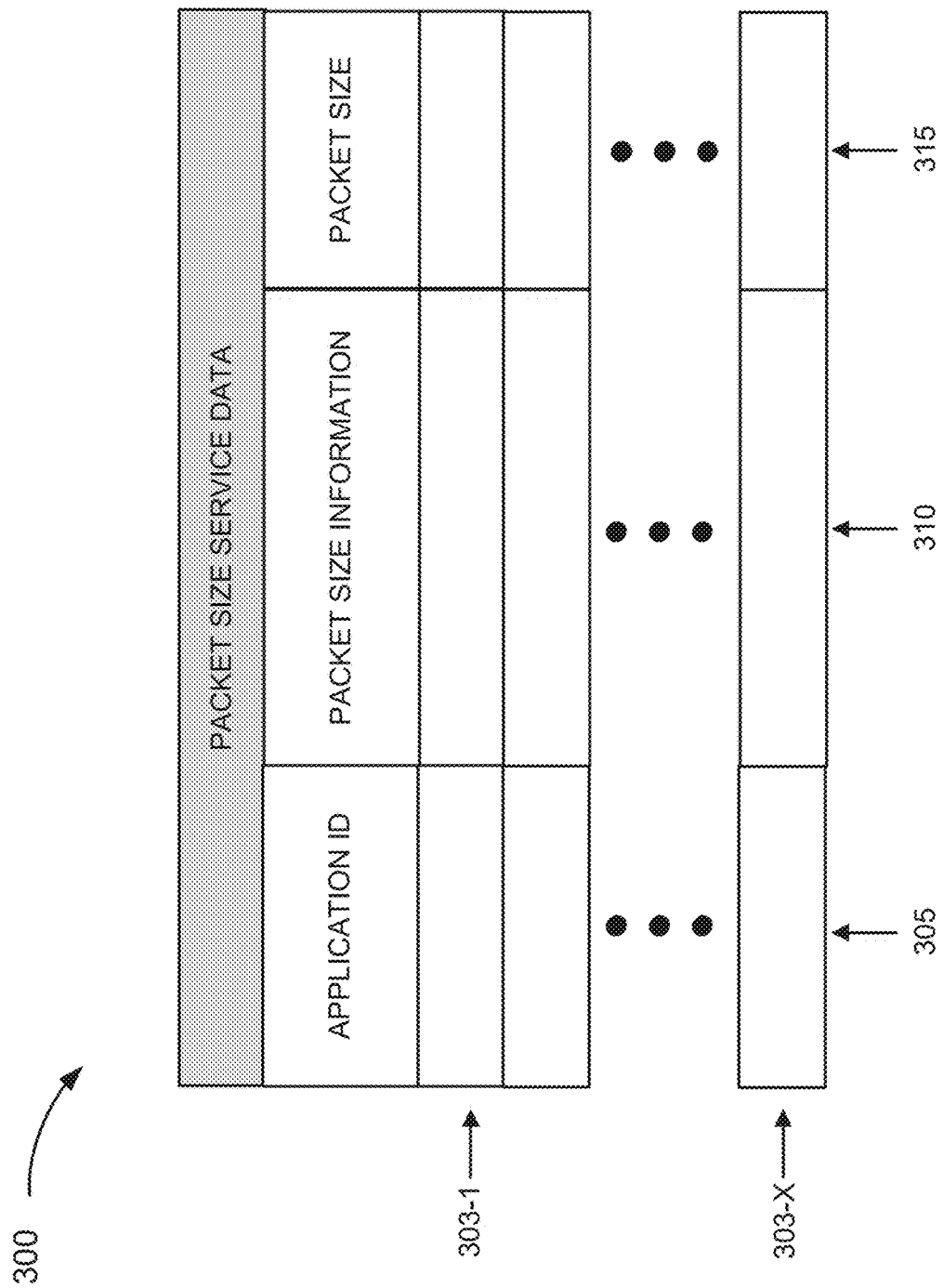
FIG. 3 is a diagram illustrating exemplary packet size service data according to an exemplary embodiment of the packet size service.

FIG. 3 is a diagram illustrating exemplary packet size service data. As illustrated, a table 300 may include an application identifier (ID) field 305, a packet size information field 310, and a packet size field 315. As further illustrated, table 300 includes records 303-1 through 303-X (also referred to as records 303, or individually or generally as record 303) that each includes a grouping of fields 305, 310, and 315. The packet size service data is illustrated in tabular form merely for the sake of description. In this regard, the packet size service data may be implemented in a data structure different from a table.

Application ID 305 may store an identifier that identifies an application service or a category of an application service. Packet size information field 310 may store a value or a range of values for each instance of the packet size information, as described herein. Packet size field 315 may store a value or a range of values indicating a total size of a packet and/or a size of the payload. The total size of the packet and/or the size of the payload may be optimal values derived from machine learning.

According to other exemplary implementations, table 300 may store additional, fewer, and/or different instances of packet size service data in support of the packet size service, as described herein. For example, packet size service data may include one or multiple fields pertaining to various other types of recommendations, as previously described, such as how the data is to be sent (e.g., pixels of an image), selection of which device provides pre-processing, and/or selection of which device provides a function or partial service of an application service. Packet size service data may be updated over time.

According to an exemplary embodiment, the values of packet size and values relating to packet size information may be based on historical information that has been previously tested. In this way, PSS device 224 may match an application identifier and packet size information values in order to select a packet size value. According to another exemplary embodiment, the machine learning system may learn the packet size values given an application service and packet size information values.

Figure 2E:
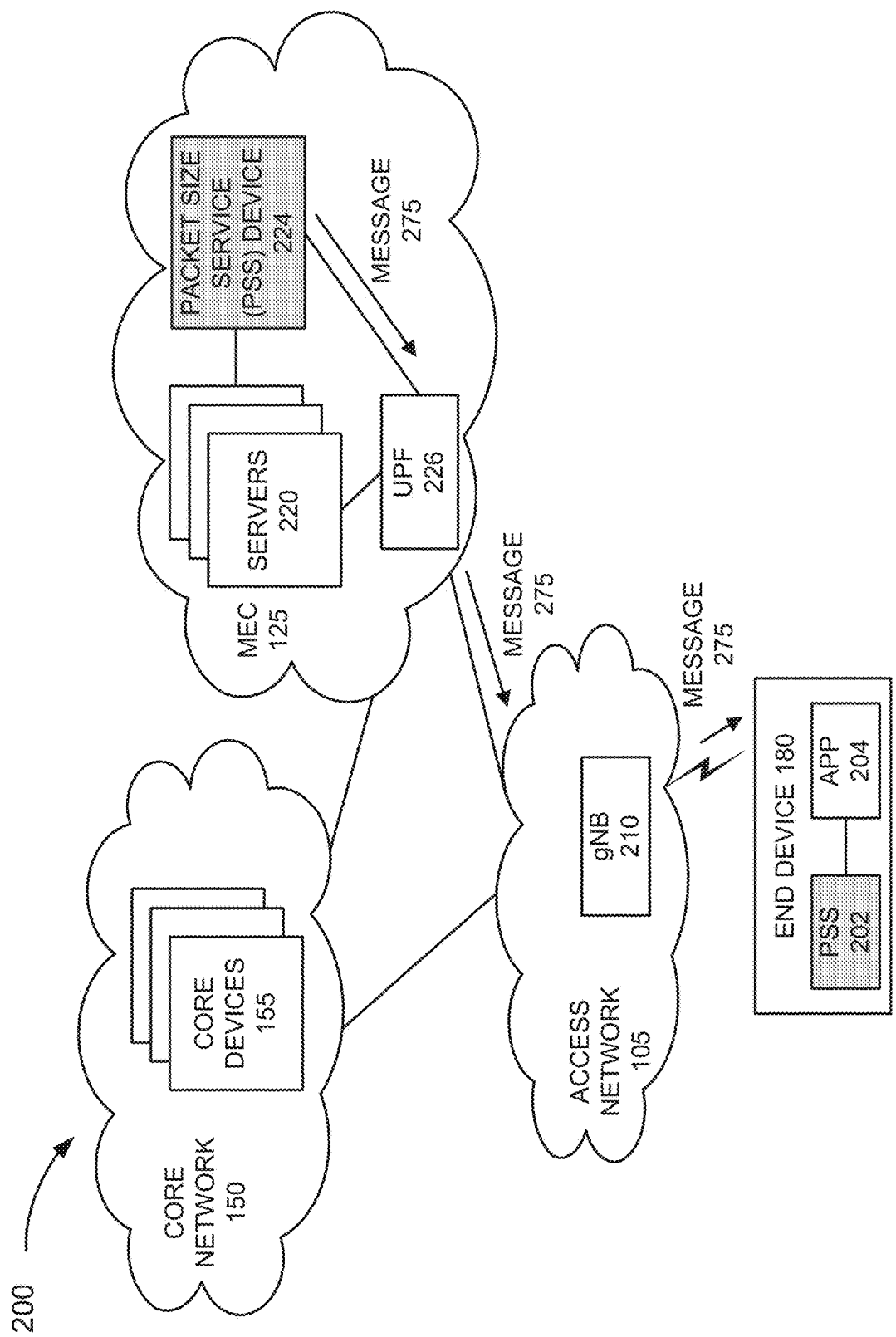
Figure 2F:
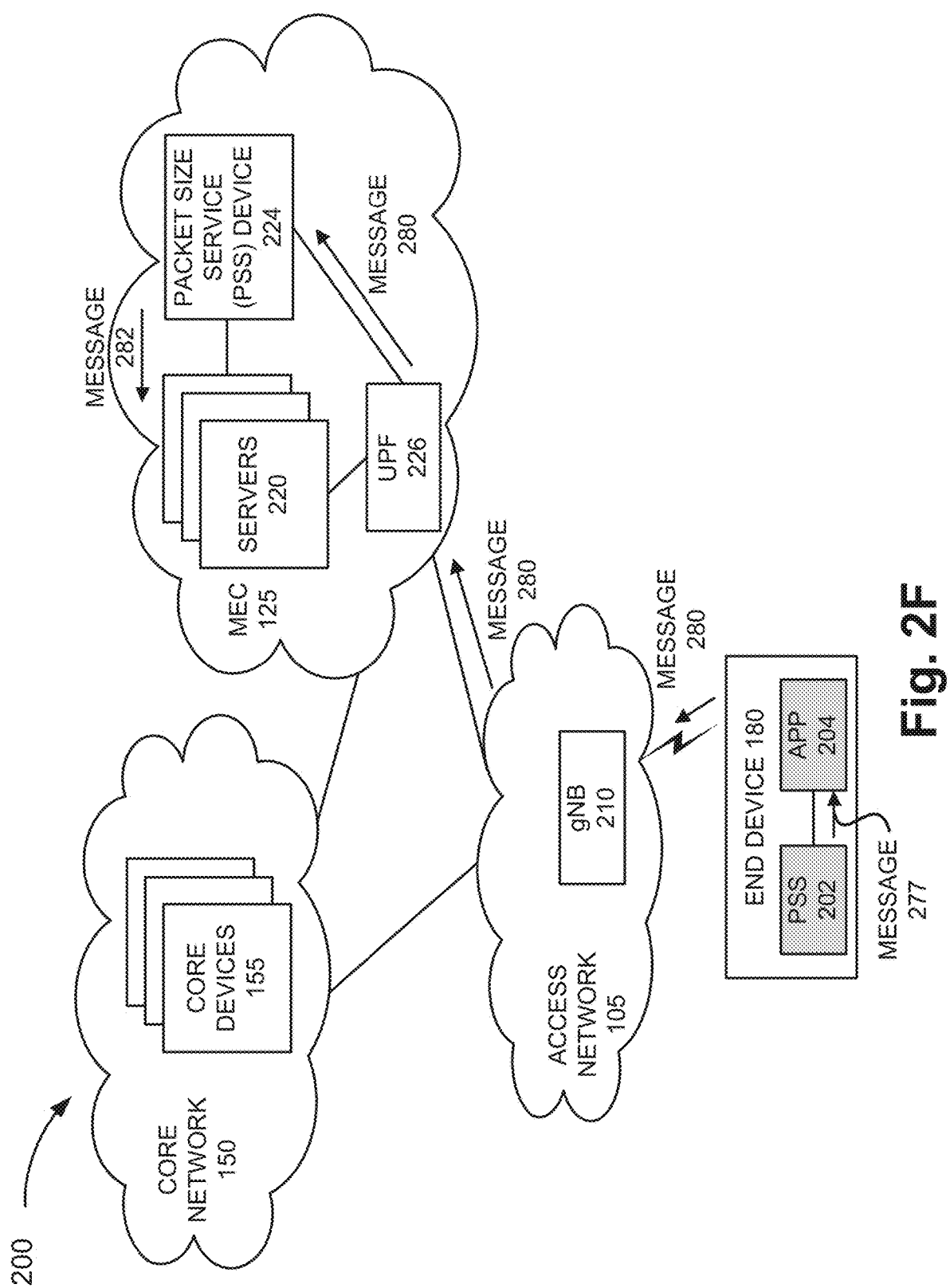

Referring to FIG. 2E, subsequent to the calculation of the packet size (e.g., size of a payload field), PSS device 224 may generate and transmit a message 275. Message 275 may include a payload size value or a range of payload size values. Message 275 may also include other types of recommendation data, as previously described. According to this exemplary scenario, PSS device 224 may transmit message 275 to end device 180. Although not illustrated, PSS device 224 may transmit message 275 to other network devices (e.g., network devices in the communication path between end device 180 and server 220 that will be used during the application service session, network control layer devices in MEC network 125, and/or share with another PSS device 224). These other network devices may acknowledge or validate the payload size value(s), and provide a response to PSS device 224. The response may indicate whether or not the payload size value(s) is/are valid or acceptable.

According to an exemplary implementation, PSS 202 of end device 180 may receive message 275. PSS 202 may evaluate the calculated payload size value(s). For example, PSS 202 may compare current resource utilization values relative to those previously provided to PSS device 224 in request 258. If differences between these values do not exceed threshold values, PSS 202 may select the payload size value (e.g., when multiple payload size values are available from which to choose) or accept the single payload size value recommended. PSS 202 may provide the payload size value to application 204 and/or other communication logic (e.g., protocol stack logic of end device 180) and any other recommendation data. However, if the differences between these values exceed the threshold values, PSS 202 may update PSS device 224 with current packet size information (e.g., load, available resource information, etc.). PSS device 224 may re-calculate the payload size value, and provide such re-calculation information to end device 180. According to other exemplary implementations, PSS 202 may not evaluate the calculated payload size value(s), but simply accept this data.

As further illustrated, according to this exemplary scenario, end device 180 may generate and transmit a message 280 to PSS device 224. Message 280 may indicate acceptance of the payload size value and any other types of recommended data. PSS device 224 may generate and transmit a message 282 to server 220. Message 282 may indicate the accepted payload size value and any other recommendation data.

Figure 2G:
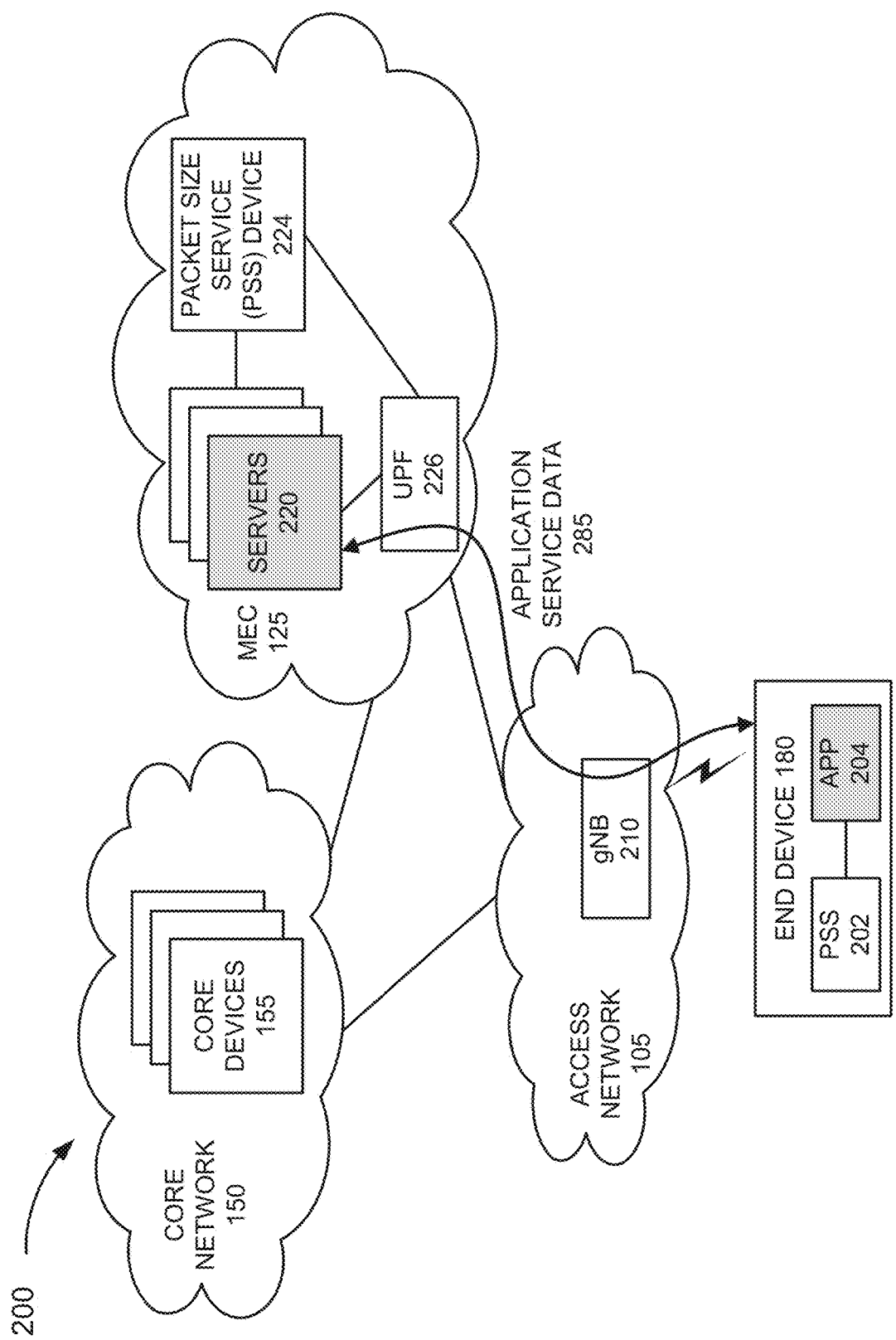

Referring to FIG. 2G, end device 180 and/or server 220 may transmit application service data 285 in accordance with the configured payload size. End device 180 and/or server 220 may also adhere to other recommendation data. For example, server 220 may identify the location of end device 180 instead of end device 180 providing this information. Additionally, or alternatively, for example, end device 180 may perform a pre-process (e.g., object rendering or some other type of pre-process) instead of server 220.

FIGS. 2A-2G illustrate an exemplary process of the packet size service, according to other exemplary embodiments, the process may include additional, different, and/or fewer steps. For example, a message, a request, data, information, or a response may be transmitted and/or received by a different device (e.g., server 220 versus PSS device 224, vice versa). Additionally, or alternatively, a message, a request, data, information, or a response may be transmitted and/or received by a different component of end device 180 (e.g., application 204 versus PSS 202, vice versa). According to some exemplary embodiments, the packet size service may be iteratively performed during the course of the application session between end device 180 and server 220. For example, PSS device 224 may receive updated packet size information, may calculate an updated packet size based on the updated packet size information, and may provide a new packet size to various devices, including end device 180 and server 220.

Figure 4:
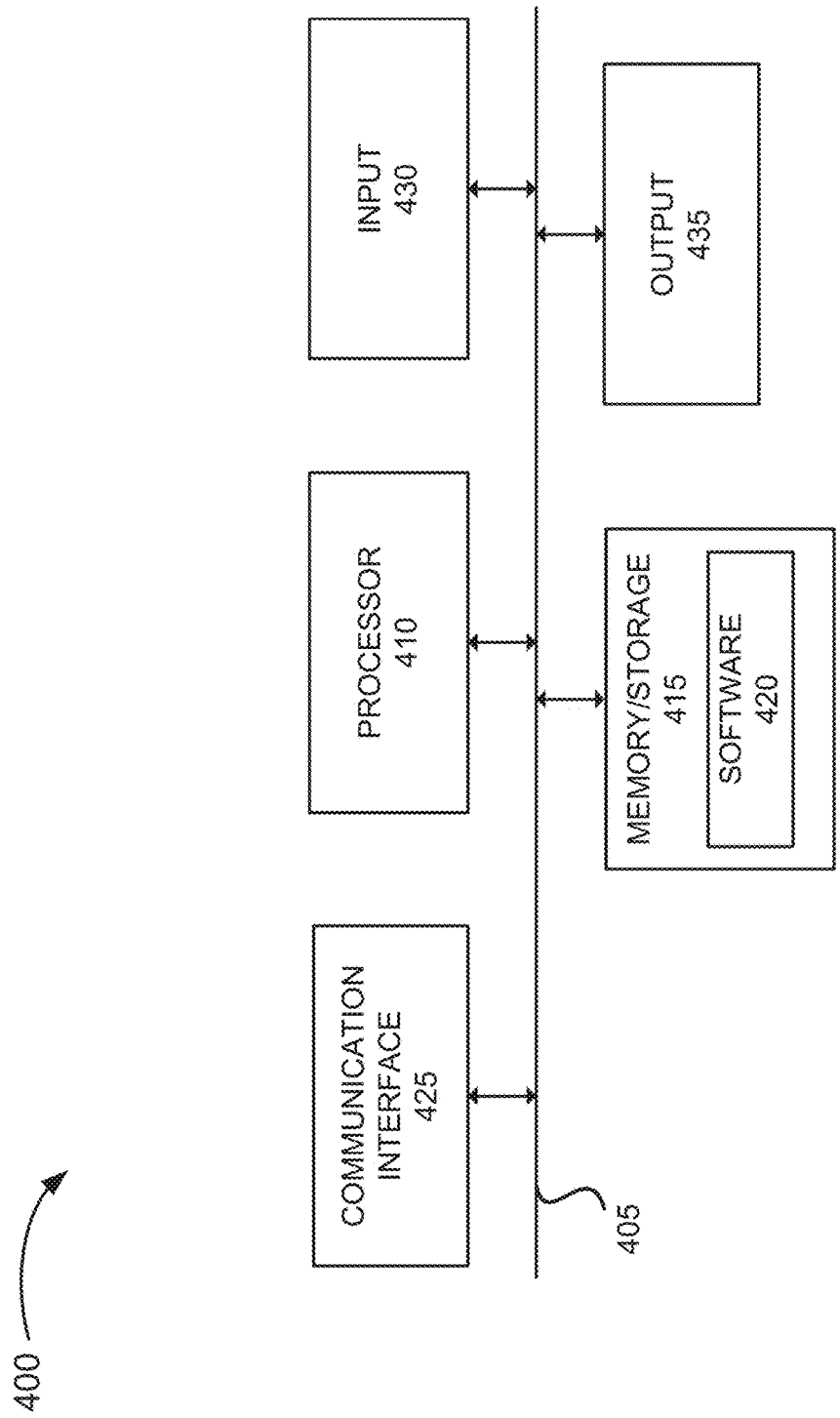
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in access device 110, MEC devices 130 of MEC network 125, core devices 155 of core network 150, external devices 165 of external network 160, end device 180, server 220, PSS device 224, UPF 226, and other network devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein. Additionally, for example, a component may include a peripheral device in relation to device 400.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/ or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a content addressable memory (CAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory (e.g., high bandwidth memory (HBM), stacked memory, hybrid memory, etc.). Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to PSS device 224, software 420 may include an application that, when executed by processor 410, provides a function of the packet size service, as described herein. Additionally, with reference to end device 180, software 420 may include an application that, when executed by processor 410, provides a function of the packet size service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, wired interfaces, and/or optical interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.), a network interface card, a port, and/or other type of communication element. Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, a microphone, an image and/or video capture device, and/or some other type of visual, auditory, tactile, etc., input component. Output 435 permits an output from device 400. For example, output 435 may include a speaker, a display, a touchscreen, a touchless screen, a light, an output port, a speaker, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
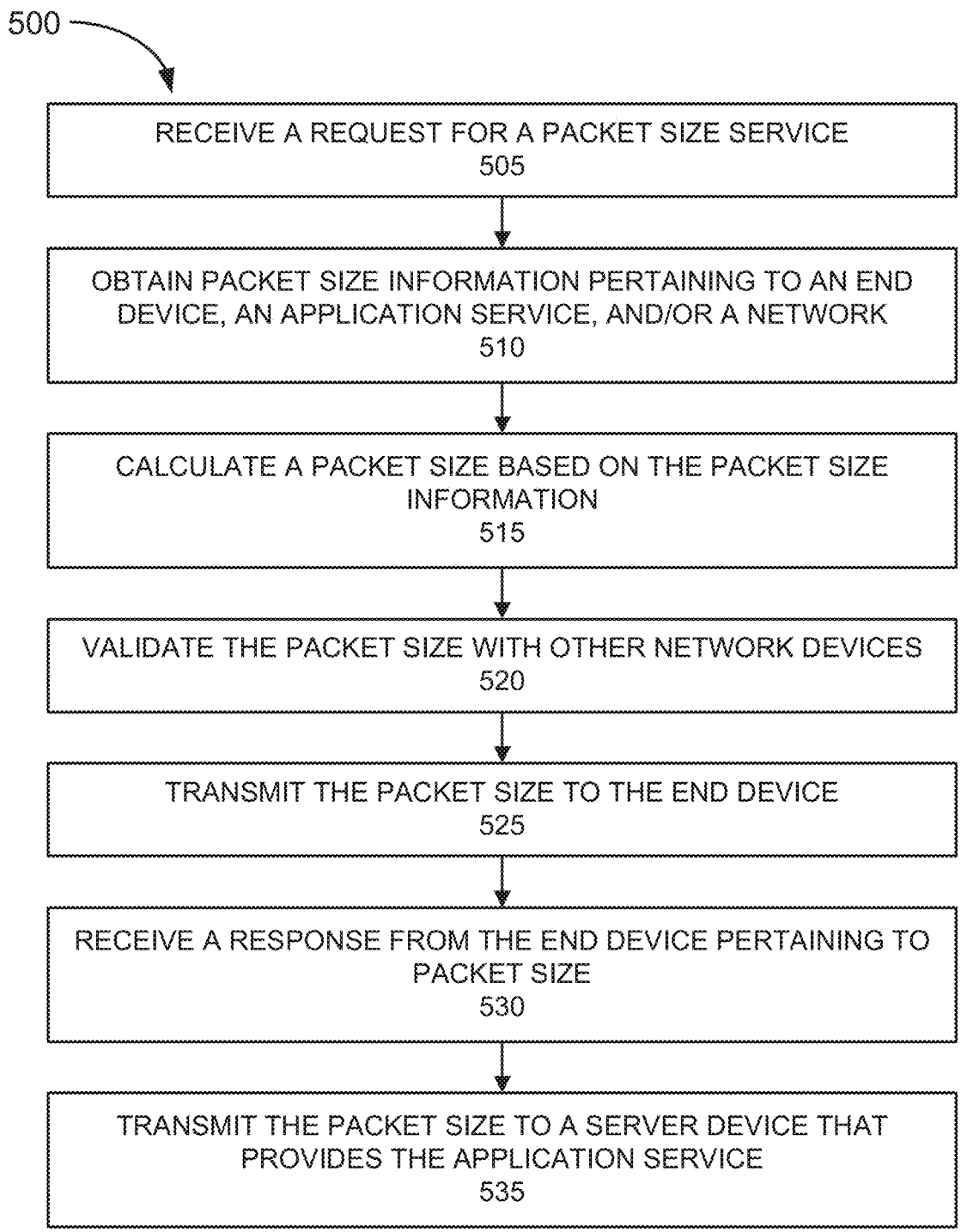
FIG. 5 is a flow diagram illustrating an exemplary process of an exemplary embodiment of the packet size service.

FIG. 5 is a flow diagram illustrating an exemplary process 500 of an exemplary embodiment of the packet size service. According to an exemplary embodiment, MEC device 130 of MEC network 125 (e.g., PSS device 224), which provides the packet size service as described herein, may performs steps of process 500. For example, processor 410 may execute software 420 to perform a step illustrated in FIG. 5, and described herein. Alternatively, for example, a step illustrated in FIG. 5 may be performed by the execution of only hardware.

Referring to FIG. 5, in block 505, for example, a request for use of a packet size service may be received. For example, PSS device 224 may receive a request from end device 180 or server 220 to invoke the packet size service. Alternatively, for example, PSS device 224 may receive some other type of trigger to invoke the packet size service, such as the expiration of a timer, according to a schedule, detection of a congestion level in an application service layer network and/or another network, or some other configurable event.

In block 510, packet size information pertaining to an end device, an application service, and/or a network may be obtained. For example, PSS device 224 may obtain QoS information, network traffic status information, application data type information, network protocol information, security requirement information, number of communication channels information, application service layer network resource information, end device resource information, preprocessing of data information, processing of application data information, and/or function and/or service information, as described herein.

In block 515, a packet size for packets may be calculated based on the packet size information. For example, PSS device 224 may calculate the packet size for packets of the application service or a category of the application service to be transmitted and/or received between the end device and the application service layer network. The packet size may indicate a total size for packets. For example, the total size may indicate a total number of bits or bytes that includes a payload and one or multiple other field or segments of the packet. Additionally, or alternatively, the packet size may indicate the size of the payload for the packets. PSS device 224 may calculate the packet size based on machine learning logic, as described herein. PSS device 224 may calculate the packet size such that a QoS for the application service is satisfied.

In block 520, the packet size may be validated with other network devices. For example, PSS device 224 may transmit the calculated packet size to other network devices in the application service layer network and/or an intermediary network device that may be in a communication path between the end device and the application service layer network. PSS device 224 may receive a response from the other network device. The response may be an acknowledgement and/or data indicating whether or not the packet size is validated. PSS device 224 may determine, based on the receipt of the response, whether to re-calculate the packet size or proceed to transmit the packet size to the end device. According to this exemplary scenario, assume that the packet size is validated and/or acknowledged.

In block 525, the packet size may be transmitted to the end device. For example, PSS device 224 may transmit a message, which includes the calculated packet size, to end device 180.

In block 530, a response from the end device pertaining to the packet size may be received. For example, PSS device 224 may receive a response to the message, which indicates an acceptance or acknowledgement of the calculated packet size, from end device 180.

In block 535, the packet size may be transmitted to a server device that provides the application service. For example, PSS device 224 may transmit a message, which includes the calculated packet size, to server 220. PSS device 224 may receive a response to the message, which indicates an acceptance or acknowledgement of the calculated packet size, from server 220. End device 180 and server 220 may transmit and/or receive packets in accordance with the calculated packet size.

FIG. 5 illustrates an exemplary process 500 of the packet size service, according to other embodiments, process 500 may include additional operations, fewer operations, and/or different operations than those illustrated in FIG. 5, and described herein. For example, PSS device 224 may calculate other parameters or recommendations relating to how application data may be sent, and/or other configurations, as previously described. Additionally, or alternatively, PSS device 224 may omit the operations of block 520. For example, PSS device 224 may be configured with a range of acceptable packet size values. PSS device 224 may compare the calculated packet size with the stored range of acceptable packet size values.

According to some exemplary embodiments, the packet size service may calculate a packet size that adheres to a minimum size and/or a maximum size (e.g., in terms of bytes or bits). For example, a standard for an Internet Protocol datagram/packet may specify a minimum and/or a maximum size. According to other exemplary embodiments, the packet size service may calculate a packet size that does not adhere to a minimum size and/or a maximum size. For example, based on the reduction or omission of a field other than the payload field (e.g., a header field, a trailer field, an options field, etc.), the packet size service may proportionally or otherwise increase the size of the payload field for carrying application service data beyond a maximum size that may not otherwise be permitted if the other field was not reduced or omitted.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. For example, according to other exemplary embodiments, the packet size service may adjust a field other than the payload field of a packet, and in turn adjust the size of the packet. For example, the packet size service may reduce (e.g., in terms of bit or byte size) another field, such as an extension field, a reserved field, an options field, a proprietary field, or other portion of the packet (e.g., a padding field when an IPv4 header ends on a 32-bit boundary, etc.), or completely omit such a field. PSS device 224 may make reduce or omit another field based on the network protocol and perhaps other packet size information, the type of application service, etc. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single or multiple physical memory or storage devices that reside(s) in or is accessible to one or multiple devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a first network device of an application service layer network, a request to provide a packet size service;
   obtaining, by the first network device in response to receiving the request, packet size information that includes quality of service (QoS) information pertaining to an application service, a network protocol of the application service, a data type of the application service, and a number of communication channels used for the application service;
   calculating, by the first network device based on the packet size information, a payload size for packets to be transmitted by at least one of an end device or a second network device of the application service layer network that provides the application service;
   validating, by the first network device, the payload size with one or more third network devices in a network path between the end device and the second network device;
   transmitting, by the first network device to the end device based on successfully validating, a first message that includes the payload size; and
   transmitting, by the first network device to the second network device based on successfully validating, a second message that includes the payload size, wherein the first message and the second message are transmitted before a session of the application service between the end device and the second network device begins.

2. The method of claim 1, further comprising:
   transmitting, during the session of the application service between the end device and the second network device, one or more packets using the calculated payload size.

3. The method of claim 1, wherein the packet size information includes a security requirement of the application service.

4. The method of claim 1, wherein the calculating further comprises:
   calculating, by the first network device, the payload size based on a machine learning system.

5. The method of claim 1, wherein the payload size does not conform to a size associated with the network protocol for the packets.

6. The method of claim 1, wherein the packet size information includes available resource information at the at least one of the end device or the second network device.

7. The method of claim 6, further comprising:
   determining, by the first network device based on the packet size information, whether application service data is pre-processed at the end device or at the second network device, and wherein at least one of the first message or the second message indicates a result of the determination.

8. The method of claim 1, wherein the application service layer network is a multi-access edge computing (MEC) network.

9. A network device comprising:
   a communication interface;
   a memory, wherein the memory stores instructions; and
   a processor, wherein the processor executes the instructions to:
   receive a request to provide a packet size service, wherein the network device is of an application service layer network;
   obtain, in response to receipt of the request, packet size information that includes quality of service (QoS) information pertaining to an application service, a network protocol of the application service, a data type of the application service, and a number of communication channels used for the application service;
   calculate, based on the packet size information, a payload size for packets to be transmitted by at least one of an end device or a second network device of the application service layer network that provides the application service;

validate the payload size with one or more third network devices in a network path between the end device and the second network device;

transmit, via the communication interface to the end device based on successful validation, a first message that includes the payload size; and transmit, via the communication interface to the second network device based on successful validation, a second message that includes the payload size, wherein the first message and the second message are transmitted before a session of the application service between the end device and the second network device begins.

10. The network device of claim 9, wherein the packet size information includes a security requirement of the application service.

11. The network device of claim 9, wherein, when calculating, the processor further executes the instructions to:
calculate the payload size based on a machine learning system.

12. The network device of claim 9, wherein the payload size does not conform to a size associated with the network protocol for the packets.

13. The network device of claim 9, wherein the packet size information includes available resource information at the at least one of the end device or the second network device.

14. The network device of claim 13, wherein the processor further executes the instructions to:
determine, based on the packet size information, whether application service data is pre-processed at the end device or at the second network device, and wherein at least one of the first message or the second message indicates a result of the determination.

15. The network device of claim 9, wherein the application service layer network is a multi-access edge computing (MEC) network.

16. A non-transitory computer-readable storage medium storing instructions executable by a processor of a network device, which when executed cause the network device to:

receive a request to provide a packet size service, wherein the network device is of an application service layer network;

obtain, in response to receipt of the request, packet size information that includes quality of service (QoS) information pertaining to an application service, a network protocol of the application service, a data type of the application service, and a number of communication channels used for the application service;

calculate, based on the packet size information, a payload size for packets to be transmitted by at least one of an end device or a second network device of the application service layer network that provides the application service;

validate the payload size with one or more third network devices in a network path between the end device and the second network device;

transmit to the end device based on successful validation, a first message that includes the payload size; and transmit to the second network device based on successful validation, a second message that includes the payload size, wherein the first message and the second message are transmitted before a session of the application service between the end device and the second network device begins.

17. The non-transitory computer-readable storage medium of claim 16, wherein the packet size information includes a security requirement of the application service.

18. The non-transitory computer-readable storage medium of claim 16, wherein the instructions to calculate further comprise instructions to:
calculate the payload size based on a machine learning system.

19. The non-transitory computer-readable storage medium of claim 16, wherein the payload size does not conform to a size associated with the network protocol for the packets.

20. The non-transitory computer-readable storage medium of claim 16, wherein the packet size information includes available resource information at the at least one of the end device or the second network device.

* * * * *